United States Patent [19]

Irick

[11] 4,272,046
[45] Jun. 9, 1981

[54] HYDRAULIC ACTUATOR MECHANISM TO CONTROL AIRCRAFT SPOILER MOVEMENTS THROUGH DUAL INPUT COMMANDS

[75] Inventor: Stephen C. Irick, Hampton, Va.

[73] Assignee: The United States of America as represented by the Administrator of the National Aeronautics and Space Administration, Washington, D.C.

[21] Appl. No.: 67,595

[22] Filed: Aug. 17, 1979

[51] Int. Cl.³ .................... B64C 13/04; B64C 13/36
[52] U.S. Cl. ................................. 244/226; 244/78; 244/213; 74/480 R; 74/479
[58] Field of Search ............... 244/213, 229, 225, 230, 244/233, 232, 226, 90 A, 78, 75 R; 74/479 R, 480 R

[56] References Cited

U.S. PATENT DOCUMENTS

| 2,910,886 | 11/1959 | Pulleys | 74/480 |
|---|---|---|---|
| 2,957,656 | 10/1960 | Lewis et al. | 244/225 |
| 3,789,692 | 2/1974 | Farr et al. | 74/480 R |
| 4,071,208 | 1/1978 | Baker | 244/213 |

Primary Examiner—Galen L. Barefoot
Attorney, Agent, or Firm—Howard J. Osborn; John R. Manning; Wallace J. Nelson

[57] ABSTRACT

The present invention is in the field of aircraft flight spoiler control mechanisms. The invention enables the conventional, primary spoiler control system to retain its operational characteristics while accommodating a secondary input controlled by a conventional computer system to supplement the settings made by the primary input. This is achieved by interposing springs between the primary input and the spoiler control unit. The springs are selected to have a stiffness intermediate the greater force applied by the primary control linkage and the lesser resistance offered by the spoiler control unit. Thus, operation of the primary input causes the control unit to yield before the springs, yet, operation of the secondary input, acting directly on the control unit, causes the springs to yield and absorb adjustments before they are transmitted into the primary control system.

4 Claims, 3 Drawing Figures

HYDRAULIC ACTUATOR MECHANISM TO CONTROL AIRCRAFT SPOILER MOVEMENTS THROUGH DUAL-INPUT COMMANDS

ORIGIN OF THE DISCLOSURE

The invention described herein was made by an employee of the U.S. Government and may be manufactured and used by or for the Government for governmental purposes without the payment of any royalties thereon or therefor.

TECHNICAL FIELD OF THE INVENTION

The present invention relates to a device that, when inserted in an aircraft flight spoiler control system, will allow apparently normal control of the spoilers by the pilot through the conventional components and linkages, while enabling a secondary, computer-directed system to intercede, imperceptibly, to adjust the nominal spoiler position set by the pilot.

BACKGROUND ART OF THE INVENTION

The prior art includes numerous mechanisms for combining inputs to a given flight surface. However, the interrelationships between flight surfaces are highly complex, and between different configurations there is a wide variation of functions. Two of the prior art inventions, Calhoun (U.S. Pat. No. 4,039,162) and Baker (U.S. Pat. No. 4,071.208) disclose apparatuses for coordinating spoiler position with flap position. In both of these inventions, the movement or position of the flight surfaces are always mutually related.

There remains a need for a spoiler-mixer control device as in the present invention, wherein the effect on the spoiler of the primary (pilot's) control is independent of the current position of the secondary input. The present invention accomodates the adjusting action of the second input.

It is therefore an object of the present invention to provide a device that can be installed in an aircraft flight spoiler control system that allows normal control by the various existing components and linkages and further provides a secondary system also able to effect control, either system being capable of operating without the other.

It is a further object of the present invention to provide for control of the spoiler mixer system by a closed-loop, computer directed, hydraulically actuated system.

It is another object of the present invention to provide apparatus for more easily and quickly maintaining a directed line of flight by making the aircraft move vertically in a direct path rather than the pilot having the aircraft climb or dive to achieve the same elevation change.

It is an additional object of the present invention to improve the flight performance of an aircraft.

It is yet another object of the present invention to provide apparatus which can be incorporated as a retrofit, thus giving an existing aircraft a capability for which it was not originally designed.

BRIEF DISCLOSURE OF THE INVENTION

The foregoing and other objects are attainable according to the present invention by providing a device including a fork-shaped input lever or bracket which is fitted onto, and pivots at its midpoint around, the input shaft of a conventional flight spoiler Position Control Unit. Position Control Units of this general type are presently employed in the Boeing 737-100 aircraft, and others. In the present invention, a spring is mounted between each arm of the fork and a tab projecting from a sleeve disposed around the input shaft. It is these springs which allow either input to act on the input shaft sleeve tab, and hence the shaft, without interferring with the other input. The springs are selected to have a stiffness intermediate the greater force applied by the primary control linkage and the lesser resistance offered by the input shaft. The cables of the primary input rotate the input lever, which acts through the springs and sleeve tab on the input shaft, causing the Position Control Unit to yield before the springs deflect. On the other hand, the hydraulic pistons of the secondary input act directly on another input shaft sleeve tab causing the springs to yield and absorb adjustments before they are transmitted back into the primary control system. The pair of springs is thus seen to act a one-way coupling, transmitting forces from the input lever to the shaft sleeve, but not vice-versa.

Either system, the servo-controlled secondary input or the spoiler mixer controlled input, is capable of functioning without the other. When the servo-controlled secondary system is not operating the springs or centering mechanisms return the input shaft to a zero position relative to the spoiler mixer. In addition, these centering mechanisms are designed to balance so that they do not apply a force beyond the centered position.

Note that the pilot (spoiler mixer) controlled input lever retains its full range of movement even though the secondary system has been designed to operate over a smaller range.

A more complete appreciation of the invention and many of the attendant advantages thereof will be readily apparent as the same becomes better understood by reference to the following description when considered in conjunction with the accompanying drawings wherein:

DETAILED DESCRIPTION OF THE INVENTION

Figure 1:
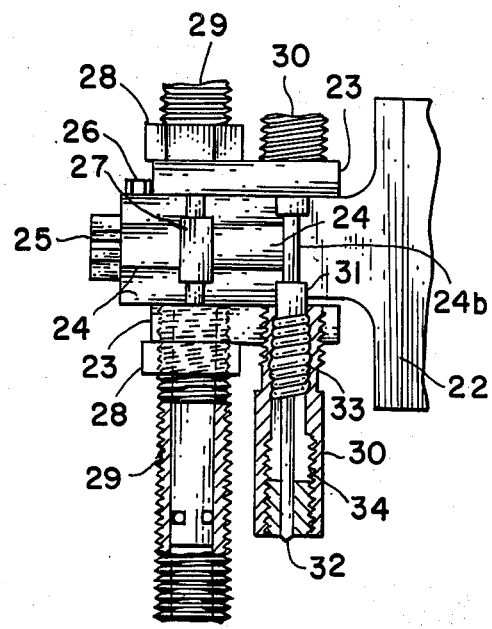
FIG. 1 is a top view of the preferred embodiment showing how the primary and secondary inputs (centering mechanisms and actuator cylinders, respectively) extend inwardly from the input lever fork arms to act upon tabs protruding from the sleeve fixed to the PCU input shaft.
Figure 3:
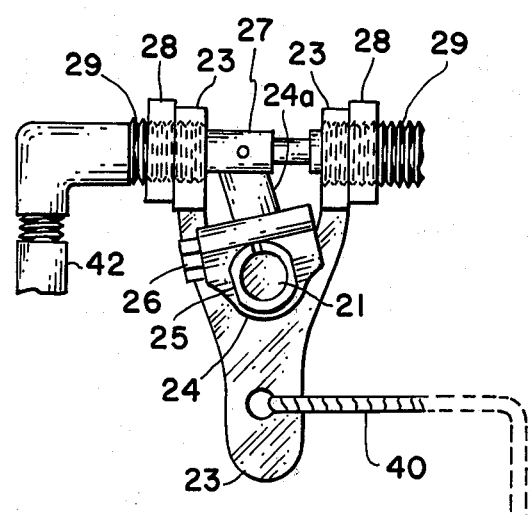
FIG. 3 is an end view as seen along line III—III of FIG. 2 and showing the input shaft rotated to one extreme by action of the actuator cylinders.
Figure 2:
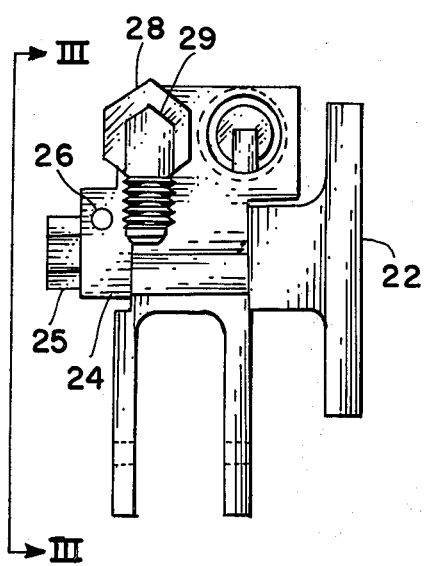
FIG. 2 is a side view of the preferred embodiment, with the centering mechanism in the front removed.

In the preferred embodiment, the device is mounted onto the input shaft 21 (visible in FIG. 3) of the flight spoiler Postion Control Unit 22 of an aircraft.

The device consists of the fork-shaped input lever 23, Position Control Unit (PCU) input shaft sleeve 24, soiler adjustment collar 25, lockbolt 26, input actuator 27, actuator locking nuts 28, actuator cylinders 29 and centering mechanisms 30.

The input lever 23, the PCU input shaft sleeve 24, and the spoiler adjustment collar 25 are mounted onto the PCU input shaft 21. This input lever 23 pivots at its midpoint around input shaft 21. The two arms of fork-shaped input lever 23 extend from this pivot axis and are disposed on either side of and parallel to a pair of tabs 24a and 24b projecting from shaft sleeve 24, which is fixed to input shaft 21. Input actuator 27 is pivotally connected to tab 24a. Input actuator 27, actuator cylinders 29, and the centering mechanisms 30 are assembled within the fork of input lever 23. The centering mechanism between one of the tabs (24b) and either arm of fork-shaped input lever 23 serves to transmit force from input lever 23 to PCU shaft sleeve 24 and hence input shaft 21. The second input, a pair of servo-actuated hydraulic pistons ("actuator cylinders") 29, also extend inwardly from each of input lever 23 arms and, when activated, push upon the other of the tabs (24a) thereby causing rotation of input shaft 21.

The (existing, in the case of a retrofit) aircraft linkage 40 from the spoiler mixer is connected to the other end of input lever 23. Using the spoiler adjustment collar 25, PCU input shaft 21 is rotated until its position, as determined by the spoiler elevation angle, corresponds to the appropriate setting of aircraft linkage 40 connected to lever 23. The spoiler adjustment collar 25 is locked in position by lockbolt 26.

Actuator 27 travel is balanced by screwing actuator cylinders 29 in the appropriate directions; actuator locking nuts 28 are tightened to maintain this adjustment. Springs 33 in the centering mechanism housings 30 are adjusted to overcome the internal friction of the Position Control Unit 22. This adjustment is made by screwing force adjuster 34 in the appropriate direction. PCU shaft sleeve 24 travel is adjusted to its center position by screwing one of the centering mechanism 30 until piston 31 contacts tab 24b projecting from PCU shaft sleeve 24. The opposite centering mechanism 30 is then brought in contact with the same tab.

Hydraulic lines 42 are connected to the actuator cylinders 29. Conventional electronic position indicators (not shown) are screwed into each of the centering mechanisms 30 and connected to the PCU shaft sleeves tab 24b by rods 32 and pistons 31.

There are two modes of operation of the device. In one, movement of the externally connected linkage 40 causes input lever 23 to rotate about its mounting point, input shaft 21. The springs 33 are preloaded to exert a greater force than that resistance offered to rotation by PCU input shaft 21. Thus, when input lever 23 rotates, piston 31 in the appropriate centering mechanism 30 pushes against shaft sleeve tab 24b thereby imparting rotation to PCU input shaft 21. In this mode, piston 31 is effectively a rigid connection between shaft sleeve tab 24b and input lever 23 because of springs 33 which press against piston 31.

In the second mode of operation of the device, hydraulic fluid is brought into actuator cylinders 29 from a closed-loop servo system (not shown). The direction and amount of actuator 27 movement is controlled by any of a variety of computer systems known in the art and not claimed as part of the present invention. The computer monitors the position of input actuator 27 through the position indicators mounted in centering mechanism 30. As input actuator 27 moves, it causes rotation of PCU input shaft 21 (see FIG. 3) by rotating the fixedly attachd PCU input shaft sleeve tab 24a. The rotation of PCU input shaft 21 causes a corresponding movement of the aircraft spoilers (now shown).

The rotation of PCU input shaft 21 through the action of input actuator 27 does not change the position of input lever 23 because the force of the springs 33 in centering mechanism 30 is less than the resistance to movement of linkage 40 connected to input lever 23. Thus, the appropriate spring 33 is compressed allowing the PCU shaft sleeve 24 to rotate, the springs 33 serving as a one-way coupling between input bracket 23 and shaft sleeve 24.

The device can be operated in either mode separately or in both means simultaneously. Either system, the servo-controlled input or the spoiler mixer controlled input, is capable of functioning without the other. When the servo-controlled system is not operating the centering mechanisms 30 return input shaft 21 to a zero position relative to the spoiler mixer. In addition, these centering mechanisms are designed to balance so that they do not apply a force beyond the centered position.

Although the invention has been described relative to a specific embodiment thereof, it is not so limited and numerous variations and modifications thereof will be readily apparent to those skilled in the art in light of the above teaching. For example, (1) the various adjustable parts can be incorporated as an integral part of, rather than attached to, each piece; (2) various types of position sensors can be attached to, or receive an indication of movement from, any of the hydraulically reacted components; and (3) other types of power sources may be used to move the input actuators, such as electrical or pneumatic.

It is therefore to be understood that within the scope of the appended claims the invention may be practiced otherwise than as specifically described.

What is claimed as new and desired to be secured by Letters Patent of the United States is:

1. In an aircraft flight spoiler control system having conventional pilot operated cockpit controls, a spoiler mixer control device, a cable linkage to each aircraft wing through which tension is applied by manipulation of the cockpit controls providing a primary input, and, mounted in each wing, a flight spoiler Position Control Unit having a rotating input shaft with a crank to which said cables are attached and apply moments, the Position Control Units in turn actuating the spoilers; the improvement therewith comprising:

means for introducing a supplementary input secondary to the primary input provided by the conventional control system, said means including a one-way coupling whereby forces in the primary input system are transferred to said input shaft and forces introduced by said secondary input system into said input shaft are absorbed by said one-way coupling before being transferred into the cable linkage of said primary input system;

said means for introducing said secondary input including a fork-shaped input lever-bracket pivotally disposed on the input shaft of said spoiler control unit, control cables attached to the said bracket, said bracket serving to transmit forces from the primary input to said one-way coupling, said bracket further serving to hold said secondary input introducing means allowing said secondary input introducing means to remain in constant proximity to and in direct contact with said input shaft while all of said bracket, one-way coupling, input shaft, and secondary input introducing means are shifted simultaneously in response to said primary target.

2. The apparatus of claim 1 wherein the said input shaft is further provided with an input shaft sleeve fixedly mounted on said shaft, said sleeve having two tabs projecting radially, parallel to the arms of said fork-spaced input bracket, one of said two tabs serving as a rigid connection between said shaft and said secondary input, the other of said tabs serving to transmit forces applied by the primary input through said one-way coupling to said shaft or to transmit forces applied to said shaft by the secondary input into said one-way coupling wherein the forces are absorbed.

3. The apparatus of claim 2 wherin the said one-way coupling comprises a pair of similar springs disposed one on either side between one of said input shaft sleeve tabs and said fork-shaped bracket, said springs having a coefficient of stiffness intermediate the greater force applied by the primary control linkage and the lesser resistance offered by said input shaft, whereby under forces imparted by said primary input through said bracket, said springs do not yield before said input shaft, but under forces applied directly by said secondary input to said input shaft, said springs yield before, and absorb forces which would otherwise be passed back into, the cable linkage of said primary control system.

4. The apparatus of claim 3 wherein the said secondary input is applied by a pair of hydraulic pistons actuated by an outside control system and mounted in each arm of said fork-shaped bracket.

* * * * *